United States Patent [19]
Hirakawa

[11] Patent Number: 5,264,965
[45] Date of Patent: Nov. 23, 1993

[54] ZOOM LENS

[75] Inventor: Jun Hirakawa, Tokyo, Japan

[73] Assignee: Asahi Kogaku Kogyo Kabushiki Kaisha, Tokyo, Japan

[21] Appl. No.: 834,659

[22] Filed: Feb. 12, 1992

[30] Foreign Application Priority Data

Feb. 15, 1991 [JP] Japan ................... 3-106952
Oct. 14, 1991 [JP] Japan ................... 3-331106

[51] Int. Cl.⁵ ............................................. G02B 15/14
[52] U.S. Cl. ...................................... 359/686; 359/683
[58] Field of Search ................................ 359/686, 683

[56] References Cited

U.S. PATENT DOCUMENTS

| | | | |
|---|---|---|---|
| 3,848,967 | 11/1974 | Grey | 359/686 |
| 4,345,821 | 8/1982 | Tachihara | 359/686 |
| 4,345,822 | 8/1982 | Tachihara | 359/686 |
| 4,591,235 | 5/1986 | Tokumaru et al. | 359/686 |
| 4,653,873 | 3/1987 | Kawamura | 359/686 |
| 4,759,617 | 7/1988 | Tokumaru et al. | 359/686 |
| 4,812,022 | 3/1989 | Sato | 359/686 |
| 4,846,562 | 7/1989 | Tokumaru et al. | 359/686 |
| 4,952,039 | 8/1990 | Ito | 359/686 |

FOREIGN PATENT DOCUMENTS

| | | |
|---|---|---|
| 2533194 | 2/1976 | Fed. Rep. of Germany . |
| 58-4113 | 1/1983 | Japan . |
| 60-55313 | 3/1985 | Japan . |
| 1-178912 | 7/1989 | Japan . |
| 820590 | 9/1959 | United Kingdom . |
| 949465 | 1/1960 | United Kingdom . |
| 900249 | 7/1962 | United Kingdom . |
| 1167373 | 10/1969 | United Kingdom . |
| 1213491 | 11/1970 | United Kingdom . |
| 1214341 | 12/1970 | United Kingdom . |
| 1258189 | 12/1971 | United Kingdom . |
| 1261119 | 1/1972 | United Kingdom . |
| 1323221 | 7/1973 | United Kingdom . |
| 1602802 | 11/1981 | United Kingdom . |
| 2080966 | 2/1982 | United Kingdom . |

Primary Examiner—Scott J. Sugarman
Attorney, Agent, or Firm—Sandler, Greenblum & Bernstein

[57] ABSTRACT

A zoom lens comprises at least four lens groups, including a negative first lens group, positive second lens group, negative third lens group and a positive fourth lens group. When the power is varied from wide angle to telescopic, the lens groups are moved such that the distances between the first and second lens groups and between the third and fourth lens groups are reduced. The distance between the second and third lens groups is increased, and an aperture disposed near the second lens group is moved together with the second lens group.

6 Claims, 15 Drawing Sheets

ZOOM LENS

BACKGROUND OF THE INVENTION

1. Field of the Invention

This invention concerns a zoom lens used in a photographic camera, and in particular concerns a zoom lens comprising at least four lens groups wherein the focal length can be varied by moving these groups relative to one another.

2. Description of the Prior Art

A conventional zoom lens comprising four lens groups is disclosed in, e.g., Japanese Laid Open Publication No. Hei 1-178912, No. Sho 58-4113 and No. Sho 60-55313.

However, in this conventional four group zoom lens, an aperture disposed in the vicinity of the third lens group is displaced together with the third lens group, when the power (focal length) is varied. If the aperture is disposed near the third lens group, the diameter of the first lens group increases in comparison to when it is disposed near the object. The focal length tends to increase, and the first lens group has to be displaced by a greater amount for focusing. If this displacement is large, a large part of the marginal light in the maximum view angle is cut off by the frame of the first lens, when the first lens group is displaced towards the object. The amount of light in the peripheral region tends to decrease. To decrease the minimum photographic distance, thereof the diameter of the first lens group must be further increased. If its diameter is fixed, the minimum photographic distance is not short.

SUMMARY OF THE INVENTION

This invention has been accomplished in view of the aforesaid problems. The objects of the present invention are to provide a zoom lens wherein the diameter of the first lens group is kept small so as to make the device compact, and wherein the minimum photographic distance is short.

To achieve the aforesaid objectives, the zoom lens of this invention comprises at least a negative first lens group, a positive second lens group, a negative third lens group and a positive fourth lens group arranged in order away from the object. The lens groups are moved so as to decrease the distance between the first and second groups and between the third and fourth groups and increase the distance between the second and third groups when the power is varied from wide angle to telescopic. Further, an aperture is provided near the second lens group which moves together with the latter when the power is varied.

DETAILED DESCRIPTION OF THE EMBODIMENTS

Figure 1:
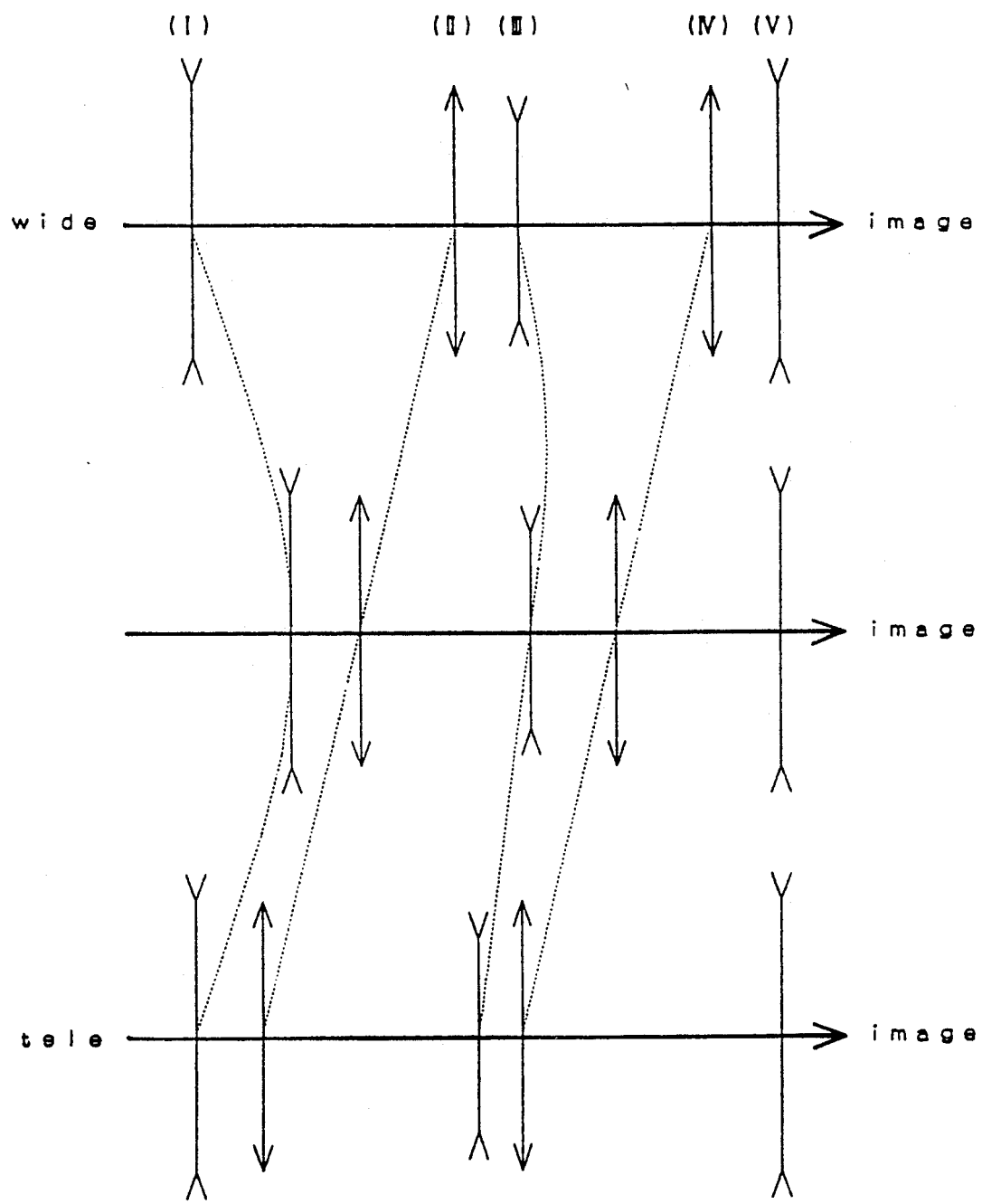
FIG. 1 is a schematic view of the zooming path of the lens groups in the zoom lens of the embodiments.

The embodiment of the present invention will now be described hereinafter with reference to the drawings. The present disclosure relates to subject matter contained in Japanese Patent Application Nos. Hei 3-106952 (filed on Feb. 15, 1989) and Hei 3-331106 (filed on Oct. 14, 1991), which are expressly incorporated herein by reference in their entireties.

The zoom lens of this invention comprises at least four lens groups arranged in the order negative, positive, negative, positive from the object. When varying the power from wide angle to telescopic, the lens groups are moved so as to reduce the distance between the first and second groups and between the third and fourth groups, and increase the distance between the second and third groups.

By making the power of the first lens group negative, sufficient peripheral light can be obtained even for close-up photography at a wide angle.

A negative fifth lens group may also be provided on the image side of the fourth group. The groups are moved so as to increase the distance between the fourth and fifth groups when the power is varied from wide angle to telescopic. By making the power of the fifth lens group negative, the overall lens system can be made compact and the displacement of the whole system when zooming, can be reduced.

An aperture is provided in the vicinity of the second lens group, preferably on the object side, which moves together with the second group when the power is varied. By positioning the aperture more towards the object than in a conventional four group zoom lens, the negative power of the first group is increased and the distance through which the first lens group is moved, for zooming, can be reduced. The diameter of the first lens group is therefore smaller than in the conventional case, and the minimum photographic distance can be reduced. Further, as the lens is more compact, sufficient space can be allowed for the motor, even if the lens drive motor which operates the zoom mechanism, is housed in the lens barrel.

In the zoom lens of the embodiment, if the focal length of the first lens group is $f_1$, the focal length of the whole system in the wide angle end is $f_w$, and the focal length of the whole system in the telescopic end is ft, it is preferable that:

$$0.4 < f_1^2/(fw \cdot ft) < 0.7, \ f_1 < 0 \tag{1}$$

Condition (1) determines the negative power of the first lens group. If this power declines to the extent that it falls below the lower limit of equation (1), the distance through which the first lens group must be moved for focusing increases, and the lens diameter has to be increased so as to ensure sufficient peripheral light when a close-up photography is taken. If on the other hand the power of the first lens group is so high as to exceed the upper limit of equation (1), spherical aberration, due to focusing in the telescopic end, increases.

If there are five lens groups and the focal length of the fifth lens group is $f_5$, it is preferable that:

$$-0.5 < ft/f_5 < 0.0 \tag{2}$$

If the negative power of the fifth lens group declines to the extent that it is below the lower limit of equation (2), it is difficult to reduce the size of the whole system. If on the other hand the negative power of the fifth lens group exceeds the upper limit of equation (2), the aberration produced by the first to fourth lens groups is increased, so as to increase the total aberration.

To correct coma aberration, it is preferable that glass having a refractive index of at least 1.7 is used for the first lens group. Further, to prevent chromatic aberration of magnification, it is preferable that the Abbe number of the negative lens is large.

FIG. 1 is a schematic view of the movement of the lens groups when the power of a five lens group is varied. In the figure, the upper part shows the wide angle end, the middle part shows the intermediate position, and the lower part shows the telescopic end. In this example, the first to fourth lens groups are moved for zooming, and the aperture S, the second lens group II and the fourth lens group IV move together. The fifth lens group is fixed. In the case of a four lens group system, the movements of the first to fourth lens groups are the same as those shown in FIG. 1.

Some numerical examples of the invention will now be described. Embodiments 1 through 3 refer to a five lens group system. Embodiment 4 describes a four lens group system. In Embodiments 2 and 3, in order to enlarge the half view angle in the wide angle end to 38°, a low power positive lens is used on the side of the first lens group which is nearest the object, so as to reduce distortion and chromatic aberration of magnification in the wide angle end. Further, in Embodiments 1 and 3, the third lens group consists of 2 groups 3 pieces, i.e. positive, negative and negative, in order to suppress spherical aberration in the telescopic end.

Embodiment 1

Figure 2:
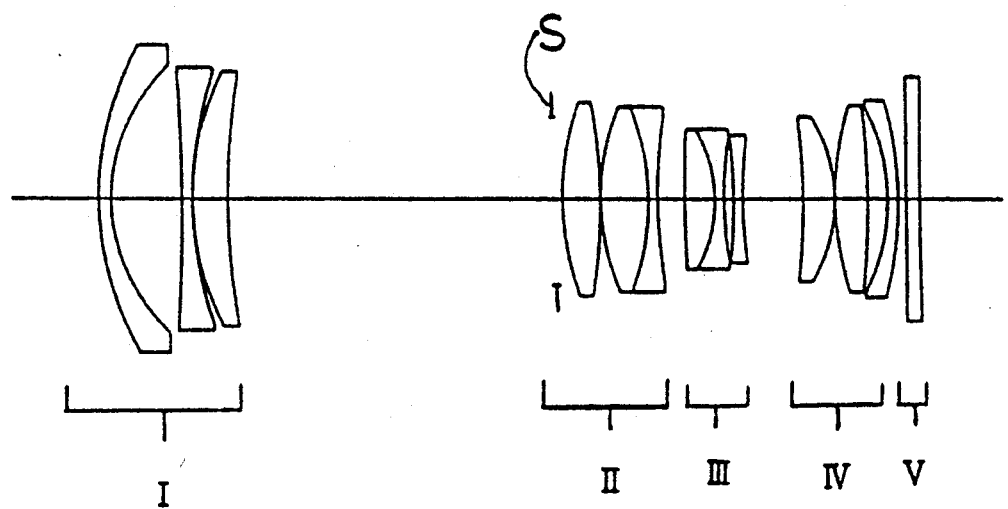
FIG. 2 is a cross section through the lens of Embodiment 1.
Figure 3:
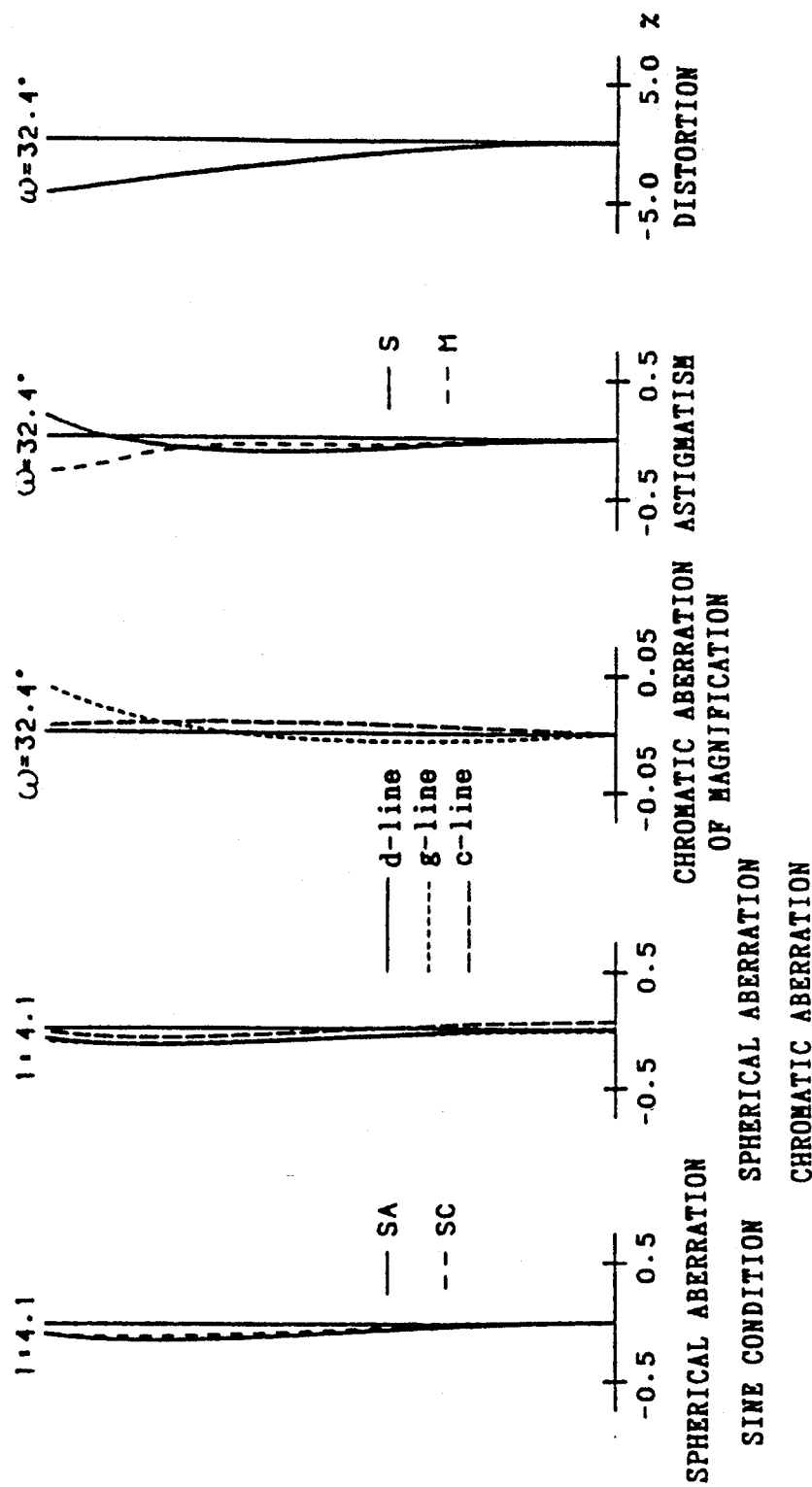
FIG. 3 is a diagram of aberrations in the wide angle end of Embodiment 1.
Figure 4:
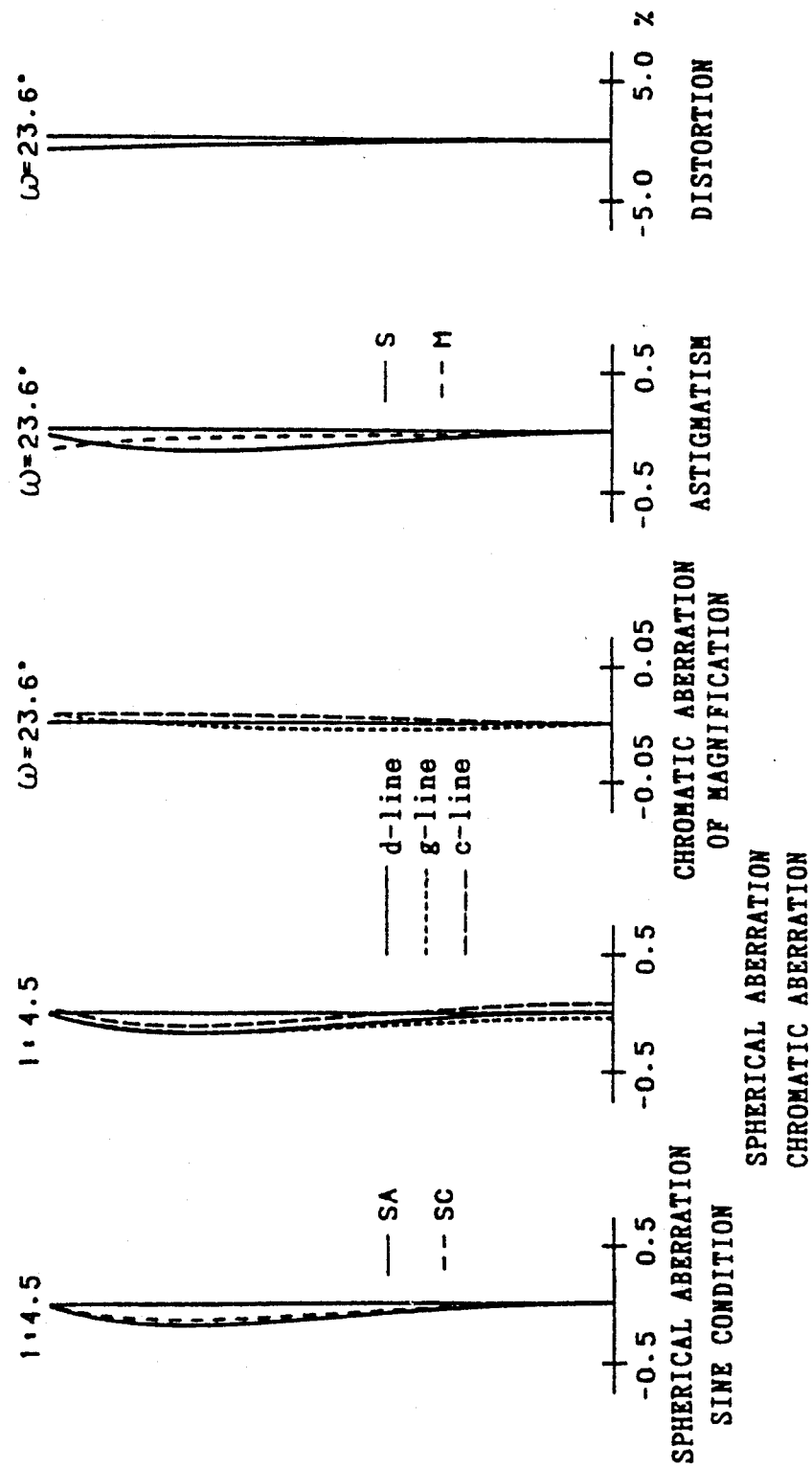
FIG. 4 is a diagram of aberrations in the intermediate focal length of Embodiment 1.
Figure 5:
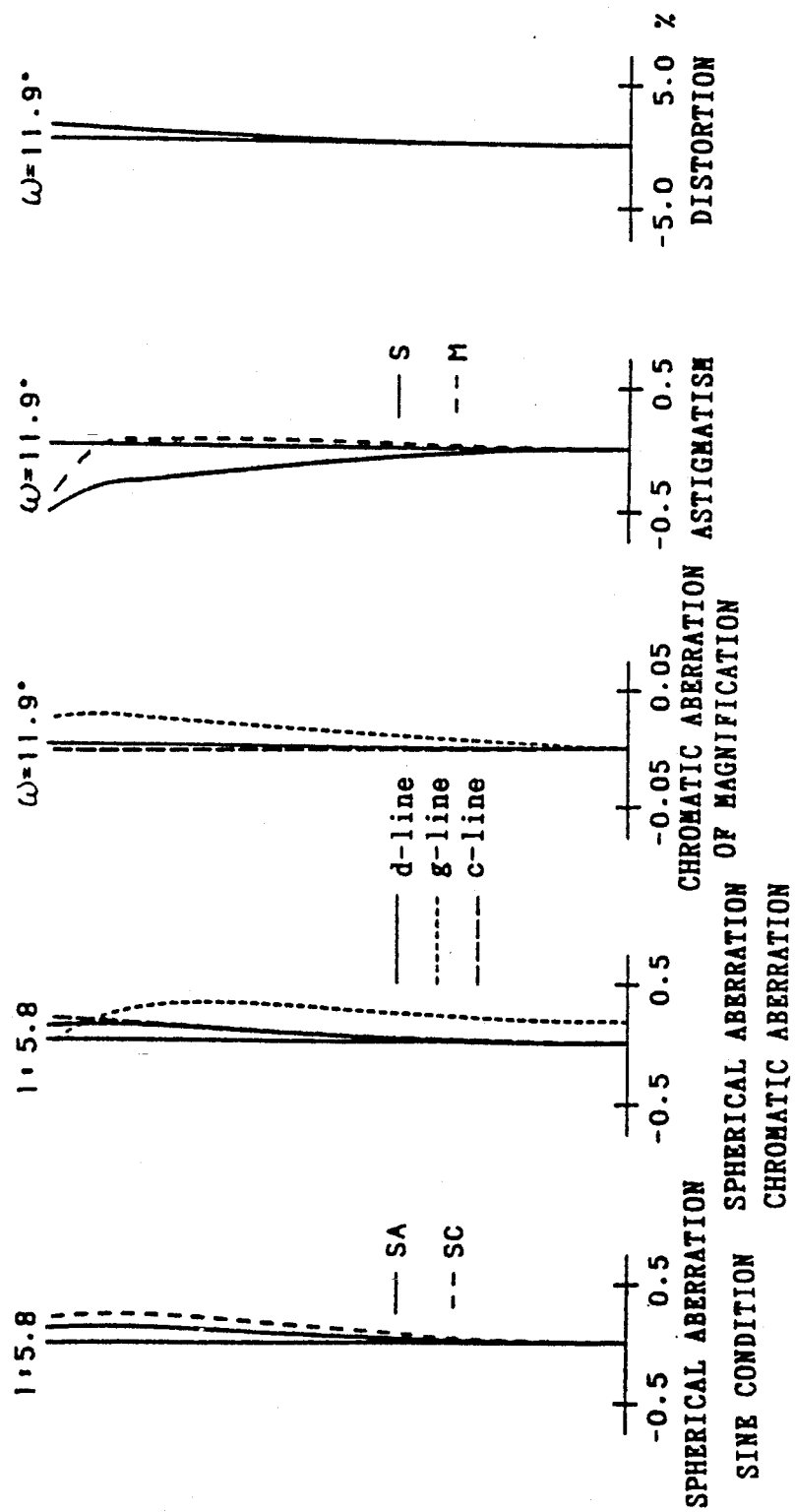
FIG. 5 is a diagram of aberrations in the telescopic end of Embodiment 1.

FIG. 2 shows a first embodiment of this invention. Specific numerical examples are shown in Tables 1 and 2. FIGS. 3, 4 and 5 show the aberrations produced by this arrangement in the wide angle end, intermediate position and telescopic end respectively. In the tables, r is radius of curvature, d is inter-surface distance, N is refractive index, $\nu$ is Abbe number, f is focal length, fB is back focus, FNo. is f-number and $\omega$ is half view angle.

TABLE 1

| Surface Number | r | d | N | $\nu$ |
|---|---|---|---|---|
| 1 | 36.459 | 1.40 | 1.77250 | 49.6 |
| 2 | 20.986 | 8.46 | | |
| 3 | −177.766 | 1.20 | 1.77250 | 49.6 |
| 4 | 44.415 | 0.10 | | |
| 5 | 32.777 | 4.12 | 1.84666 | 23.9 |
| 6 | 86.558 | variable | | |
| 7 | 34.245 | 4.41 | 1.61800 | 63.4 |
| 8 | −61.976 | 0.10 | | |
| 9 | 28.312 | 5.57 | 1.62041 | 60.3 |
| 10 | −28.498 | 1.10 | 1.76182 | 26.5 |
| 11 | 67.769 | variable | | |
| 12 | 208.719 | 3.67 | 1.76182 | 26.5 |
| 13 | −15.338 | 1.10 | 1.78590 | 44.2 |
| 14 | 48.907 | 1.19 | | |
| 15 | −60.315 | 1.10 | 1.83400 | 37.2 |
| 16 | 57.317 | variable | | |
| 17 | −69.892 | 3.67 | 1.48749 | 70.2 |
| 18 | −18.193 | 0.10 | | |
| 19 | 37.199 | 3.82 | 1.51454 | 54.7 |
| 20 | −87.198 | 2.38 | | |
| 21 | −22.549 | 1.20 | 1.78590 | 44.2 |
| 22 | −42.365 | variable | | |
| 23 | −1000.000 | 1.50 | 1.76182 | 26.5 |
| 24 | 783.827 | | | |

TABLE 2

| f | 35.7 | 50.0 | 101.6 |
|---|---|---|---|
| $d_6$ | 39.76 | 23.20 | 3.90 |
| $d_{11}$ | 3.15 | 4.37 | 7.99 |
| $d_{16}$ | 7.24 | 6.02 | 2.40 |
| $d_{22}$ | 1.00 | 9.46 | 37.12 |
| FNo. | 1:4.1 | 1:4.5 | 1:5.8 |
| $\omega$ | 32.4° | 23.6° | 11.9° |
| fb | 38.8 | 38.8 | 38.8 |

Embodiment 2

Figure 6:
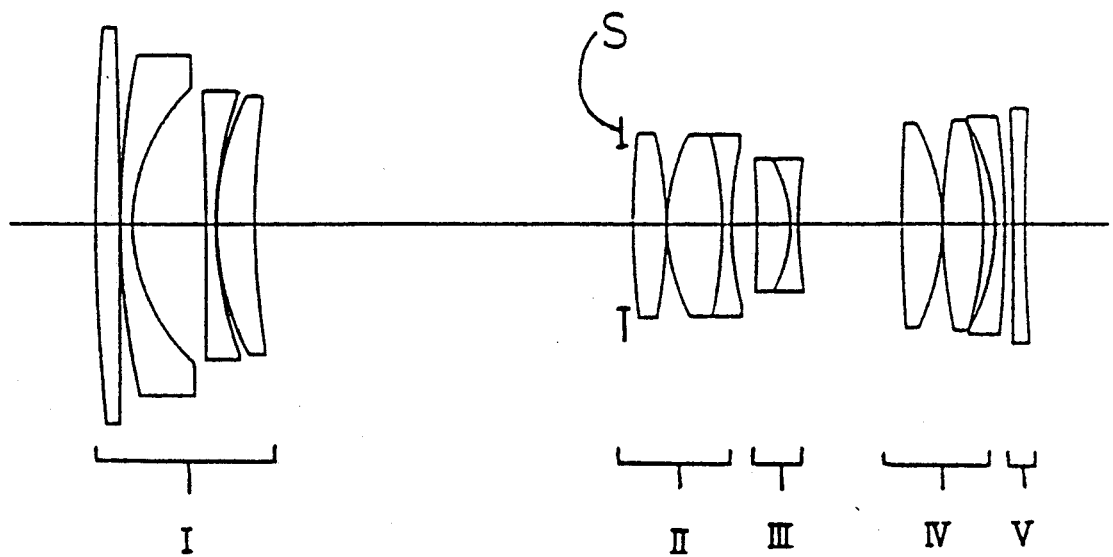
FIG. 6 is a cross section through the lens of Embodiment 2.
Figure 7:
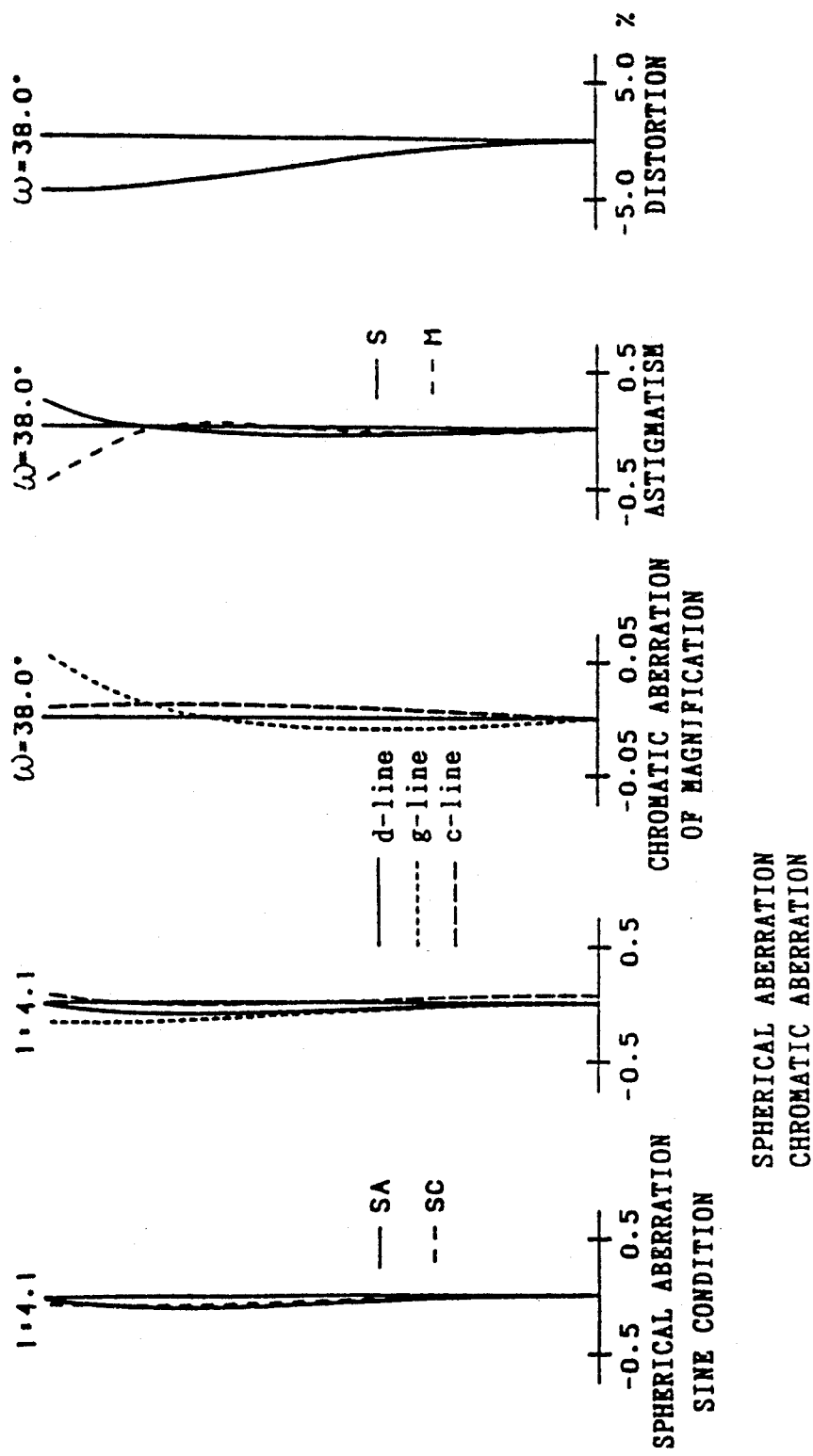
FIG. 7 is a diagram of aberrations in the wide angle end of Embodiment 2.
Figure 8:
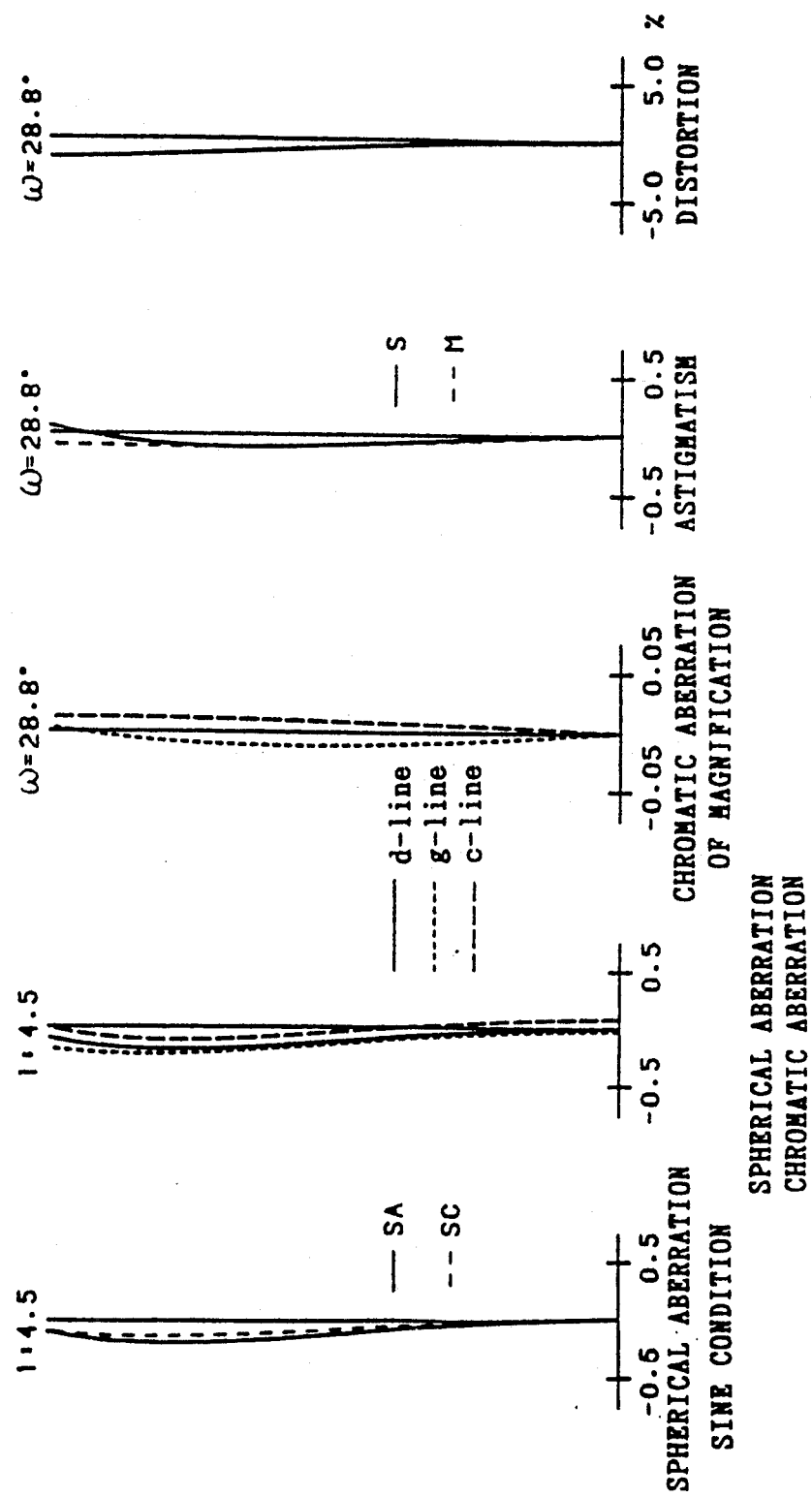
FIG. 8 is a diagram of aberrations in the intermediate focal length of Embodiment 2.
Figure 9:
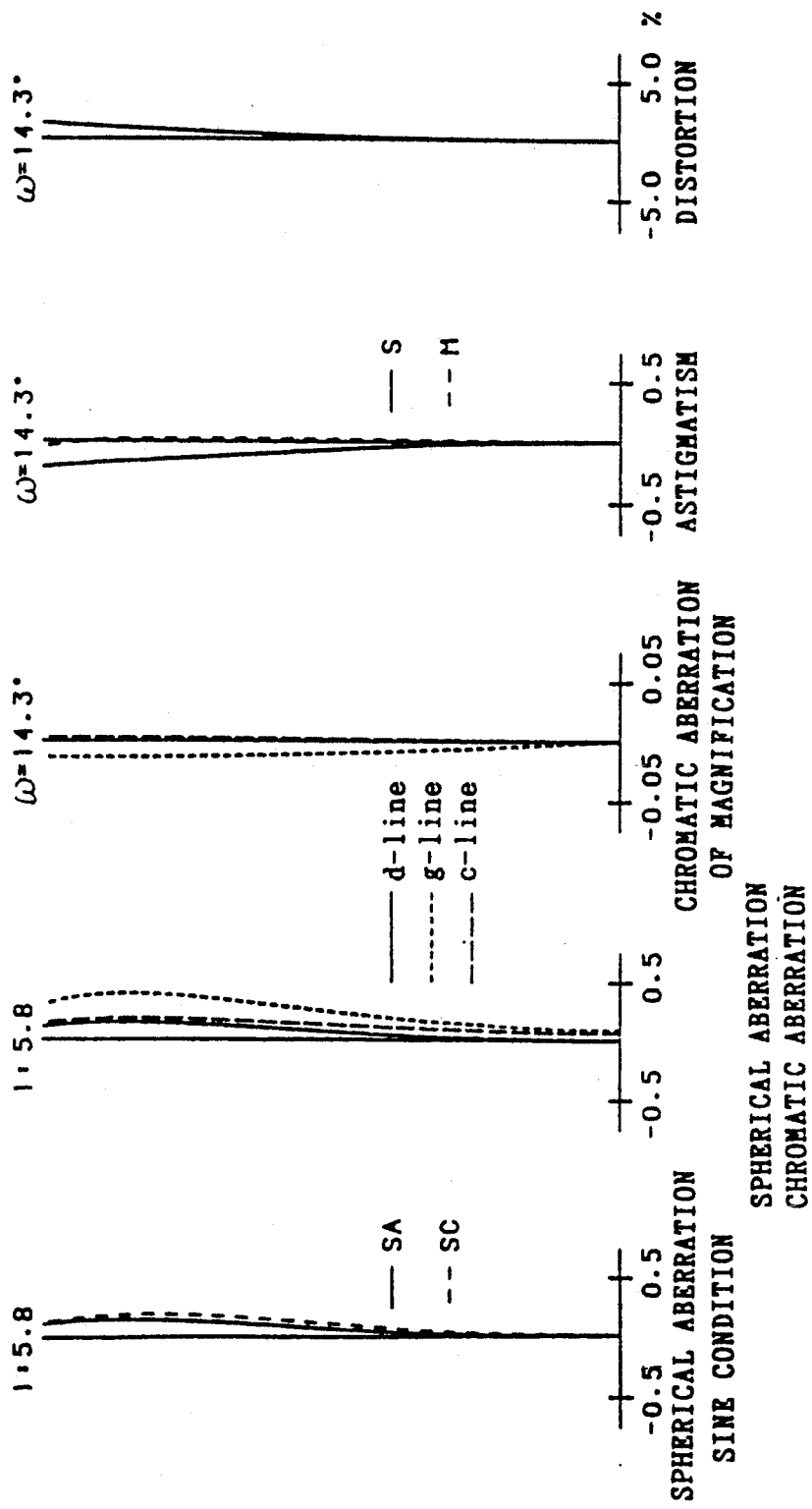
FIG. 9 is a diagram of aberrations in the telescopic end of Embodiment 2.

FIG. 6 shows a second embodiment of this invention. Specific numerical examples are shown in Tables 3 and 4. FIGS. 7, 8 and 9 show the aberrations produced by this arrangement in the wide angle end, intermediate position and telescopic end respectively.

TABLE 3

| Surface Number | r | d | N | $\nu$ |
|---|---|---|---|---|
| 1 | 255.632 | 2.91 | 1.78590 | 44.2 |
| 2 | −1033.458 | 0.10 | | |
| 3 | 99.052 | 1.40 | 1.77250 | 49.6 |
| 4 | 21.843 | 8.70 | | |
| 5 | −576.263 | 1.20 | 1.77250 | 49.6 |
| 6 | 43.799 | 0.10 | | |
| 7 | 33.096 | 4.52 | 1.84666 | 23.9 |
| 8 | 96.657 | variable | | |
| 9 | 91.301 | 4.17 | 1.61800 | 63.4 |
| 10 | −44.445 | 0.10 | | |
| 11 | 22.373 | 6.81 | 1.62041 | 60.3 |
| 12 | −41.386 | 1.10 | 1.76182 | 26.5 |
| 13 | 39.226 | variable | | |
| 14 | −113.807 | 3.94 | 1.76182 | 26.5 |
| 15 | −15.667 | 1.00 | 1.78590 | 44.2 |
| 16 | 49.160 | variable | | |
| 17 | 166.398 | 4.94 | 1.48749 | 70.2 |
| 18 | −25.207 | 0.10 | | |
| 19 | 64.127 | 4.78 | 1.51454 | 54.7 |
| 20 | −39.296 | 1.36 | | |
| 21 | −24.971 | 1.20 | 1.78590 | 44.2 |
| 22 | −103.035 | variable | | |
| 23 | −500.000 | 1.50 | 1.71736 | 29.5 |
| 24 | 211.943 | | | |

TABLE 4

| f | 29.0 | 40.0 | 82.0 |
|---|---|---|---|
| $d_8$ | 46.20 | 28.96 | 7.54 |
| $d_{13}$ | 3.15 | 5.59 | 13.24 |
| $d_{16}$ | 12.49 | 10.05 | 2.40 |
| $d_{22}$ | 1.00 | 7.47 | 32.39 |
| FNo. | 1:4.1 | 1:4.5 | 1:5.8 |
| ω | 38.0° | 28.8° | 14.3° |
| fb | 38.8 | 38.8 | 38.8 |

Embodiment 3

Figure 10:
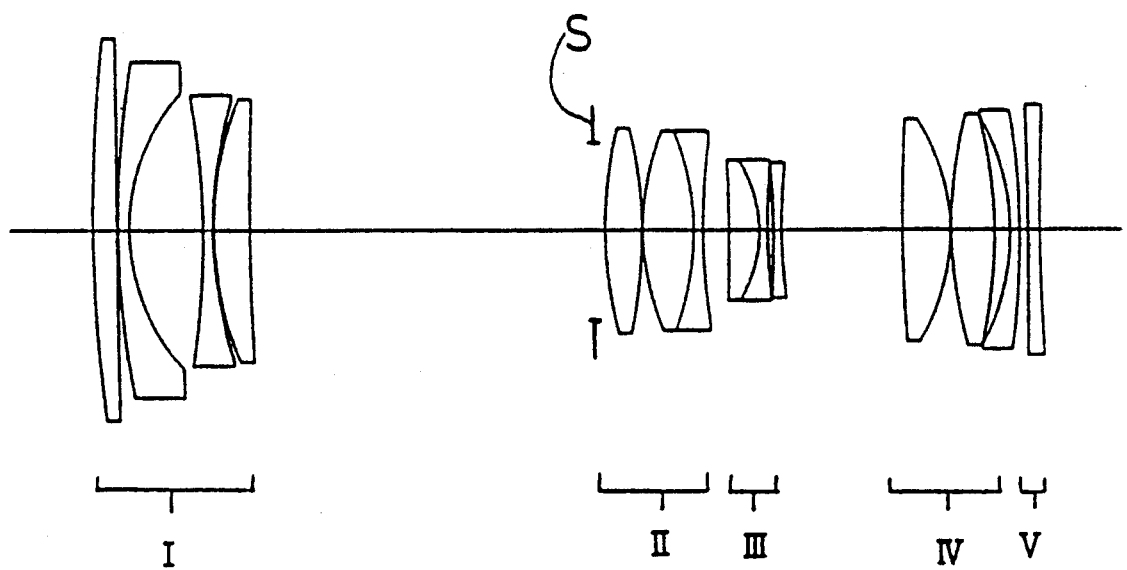
FIG. 10 is a cross section through the lens of Embodiment 3.
Figure 11:
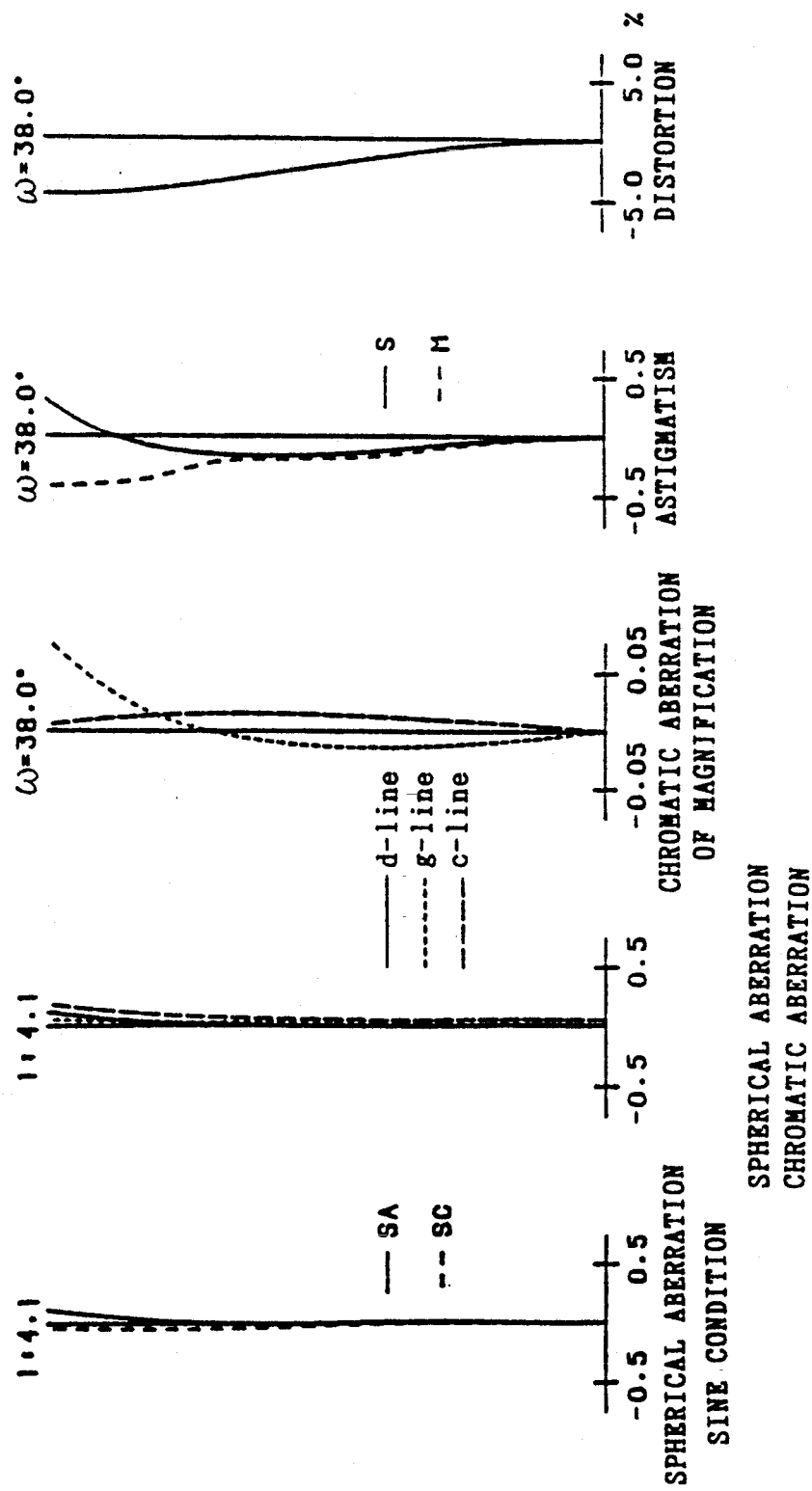
FIG. 11 is a diagram of aberrations in the wide angle end of Embodiment 3.
Figure 12:
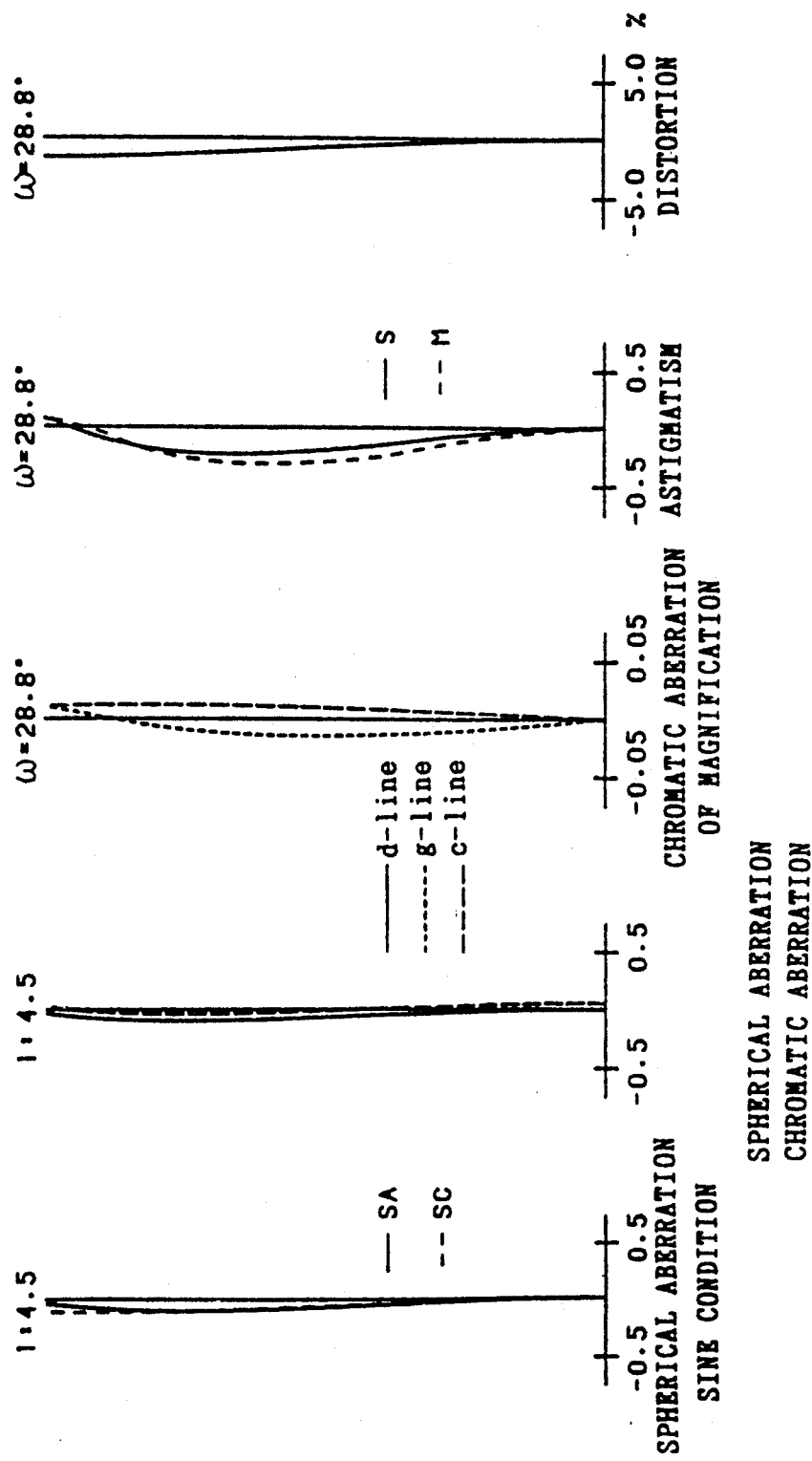
FIG. 12 is a diagram of aberrations in the intermediate focal length of Embodiment 3.
Figure 13:
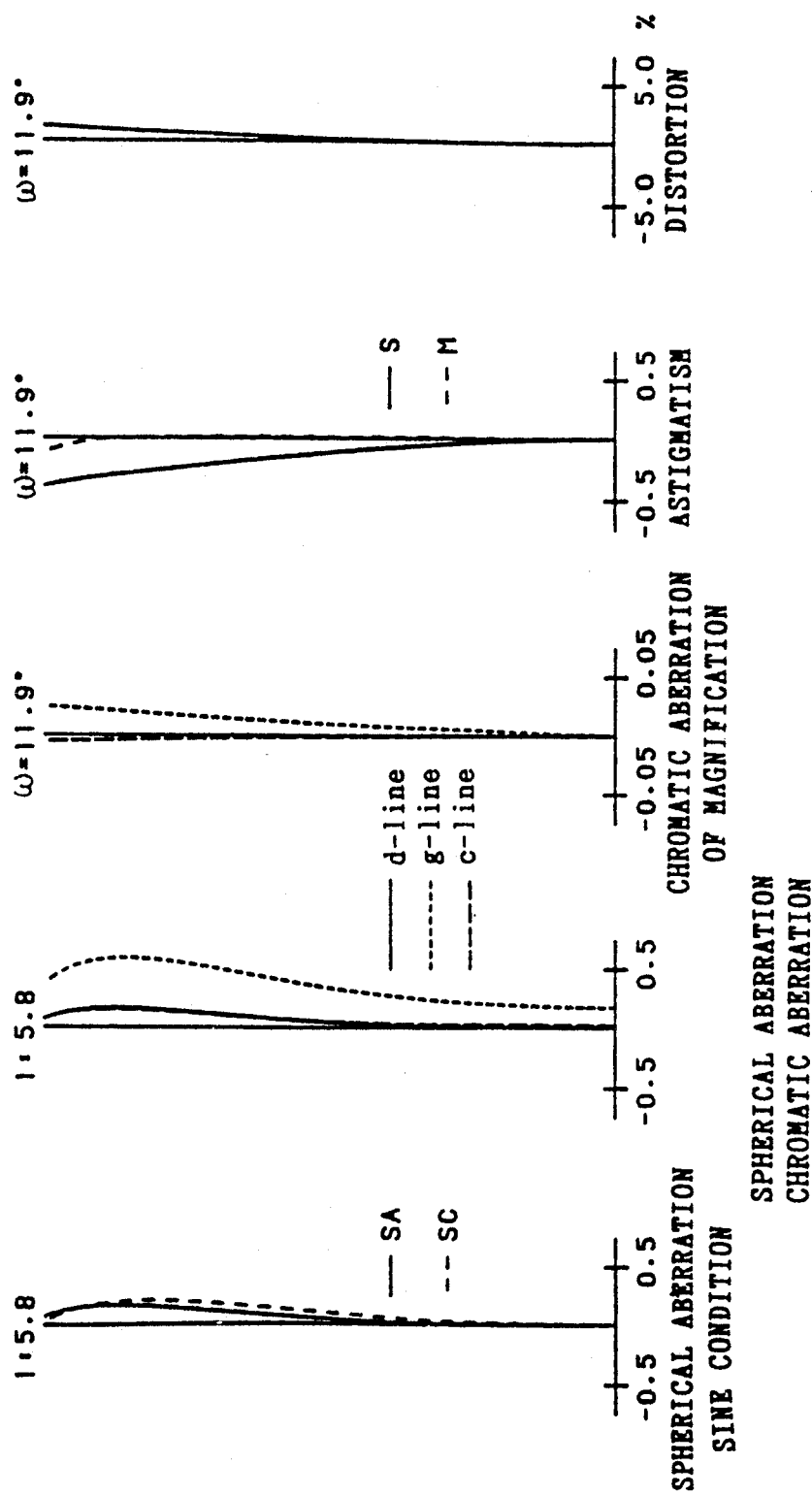
FIG. 13 is a diagram of aberrations in the telescopic end of Embodiment 3.

FIG. 10 shows a third embodiment of this invention. Specific numerical examples are shown in Tables 5 and 6. FIGS. 11, 12 and 13 show the aberrations produced by this arrangement in the wide angle end, intermediate position and telescopic end respectively.

TABLE 5

| Surface Number | r | d | N | υ |
|---|---|---|---|---|
| 1 | 166.155 | 3.00 | 1.78590 | 44.2 |
| 2 | 2258.151 | 0.10 | | |
| 3 | 104.837 | 1.40 | 1.77250 | 49.6 |
| 4 | 23.650 | 8.83 | | |
| 5 | −97.358 | 1.20 | 1.77250 | 49.6 |
| 6 | 50.261 | 0.10 | | |
| 7 | 39.716 | 4.29 | 1.84666 | 23.9 |
| 8 | 312.638 | variable | | |
| 9 | 46.271 | 4.44 | 1.61800 | 63.4 |
| 10 | −53.701 | 0.10 | | |
| 11 | 29.313 | 6.21 | 1.62041 | 60.3 |
| 12 | −30.907 | 1.10 | 1.76182 | 26.5 |
| 13 | 71.418 | variable | | |
| 14 | −197.515 | 3.60 | 1.76182 | 26.5 |
| 15 | −15.669 | 1.00 | 1.78590 | 44.2 |
| 16 | 93.118 | 0.69 | | |
| 17 | −128.841 | 1.00 | 1.83400 | 37.2 |
| 18 | 63.731 | variable | | |
| 19 | 157.379 | 5.76 | 1.48749 | 70.2 |
| 20 | −24.479 | 0.10 | | |
| 21 | 48.853 | 5.20 | 1.51454 | 54.7 |
| 22 | −54.061 | 1.86 | | |
| 23 | −28.001 | 1.20 | 1.78590 | 44.2 |
| 24 | −93.629 | variable | | |
| 25 | −933.686 | 1.50 | 1.76182 | 26.5 |
| 26 | 240.157 | | | |

TABLE 6

| f | 29.0 | 40.0 | 101.6 |
|---|---|---|---|
| $d_8$ | 43.08 | 26.45 | 2.88 |
| $d_{13}$ | 3.15 | 6.26 | 15.22 |
| $d_{18}$ | 14.45 | 11.36 | 2.40 |
| $d_{24}$ | 1.00 | 5.54 | 38.20 |
| FNo. | 1:4.1 | 1:4.5 | 1:5.8 |
| ω | 38.0° | 28.8° | 11.9° |
| fb | 38.8 | 38.8 | 38.8 |

Embodiment 4

Figure 14:
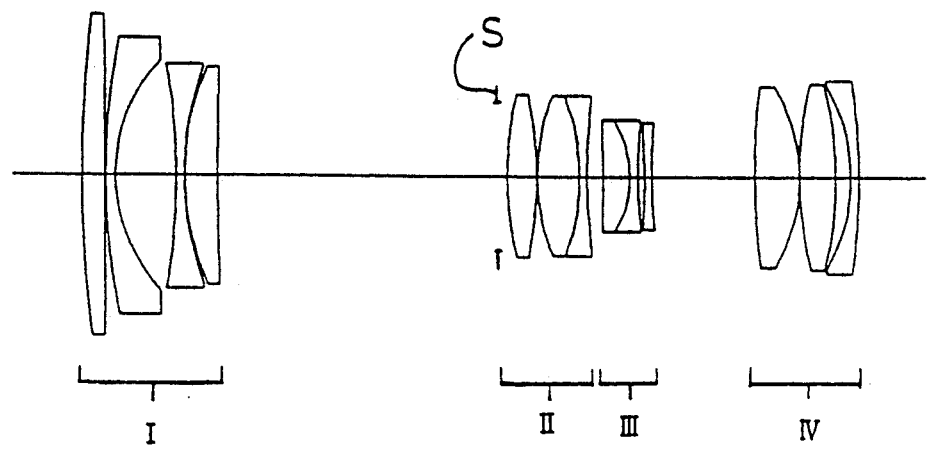
FIG. 14 is a cross section through the lens of Embodiment 4.

FIG. 14 shows a fourth embodiment of this invention. Specific numerical examples are shown in Tables 7 and 8.

Figure 15:
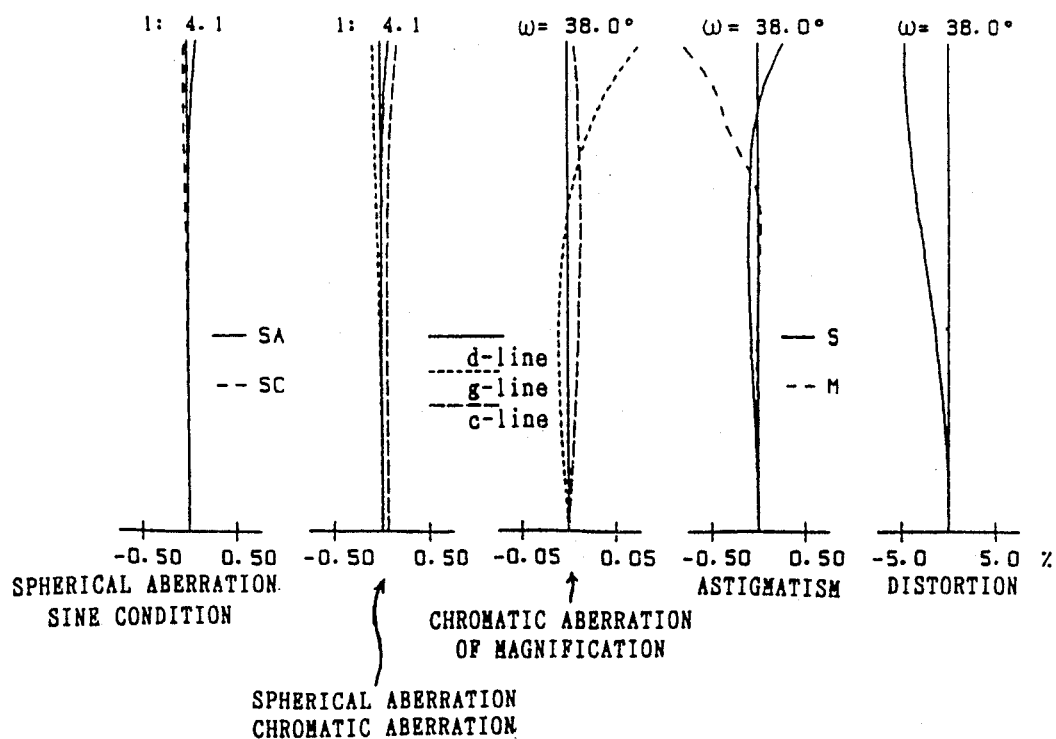
FIG. 15 is a diagram of aberrations in the wide angle end of Embodiment 4.
Figure 16:
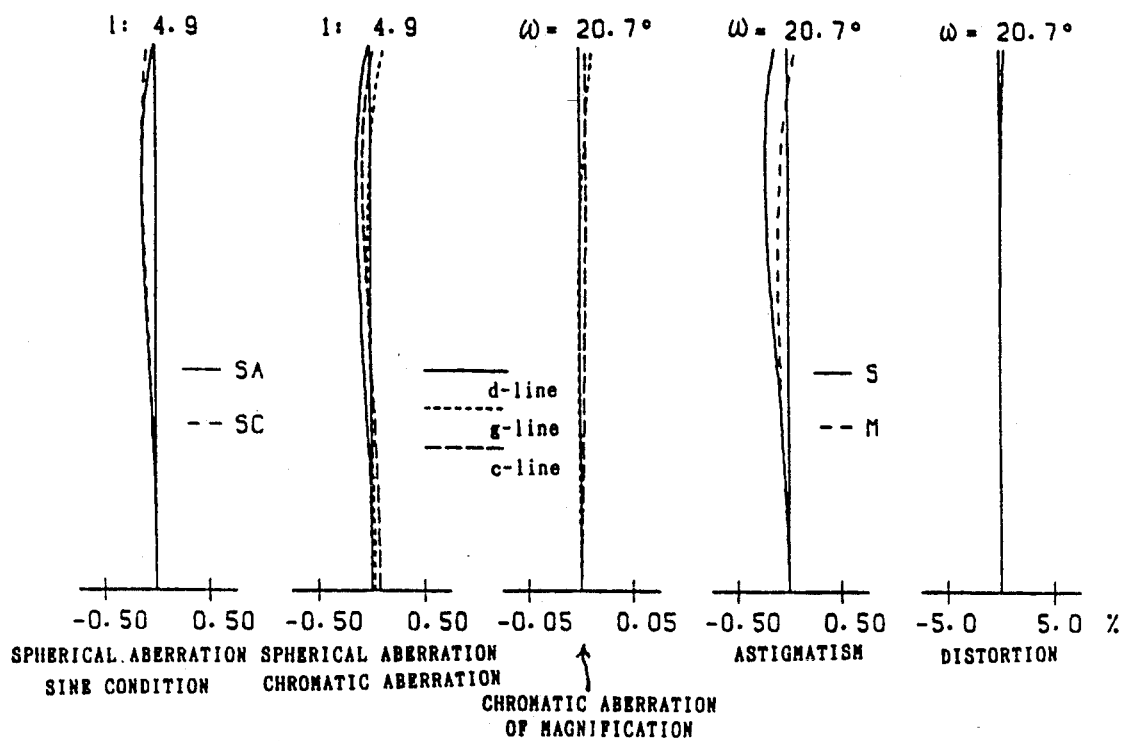
FIG. 16 is a diagram of aberrations in the intermediate focal length of Embodiment 4.
Figure 17:
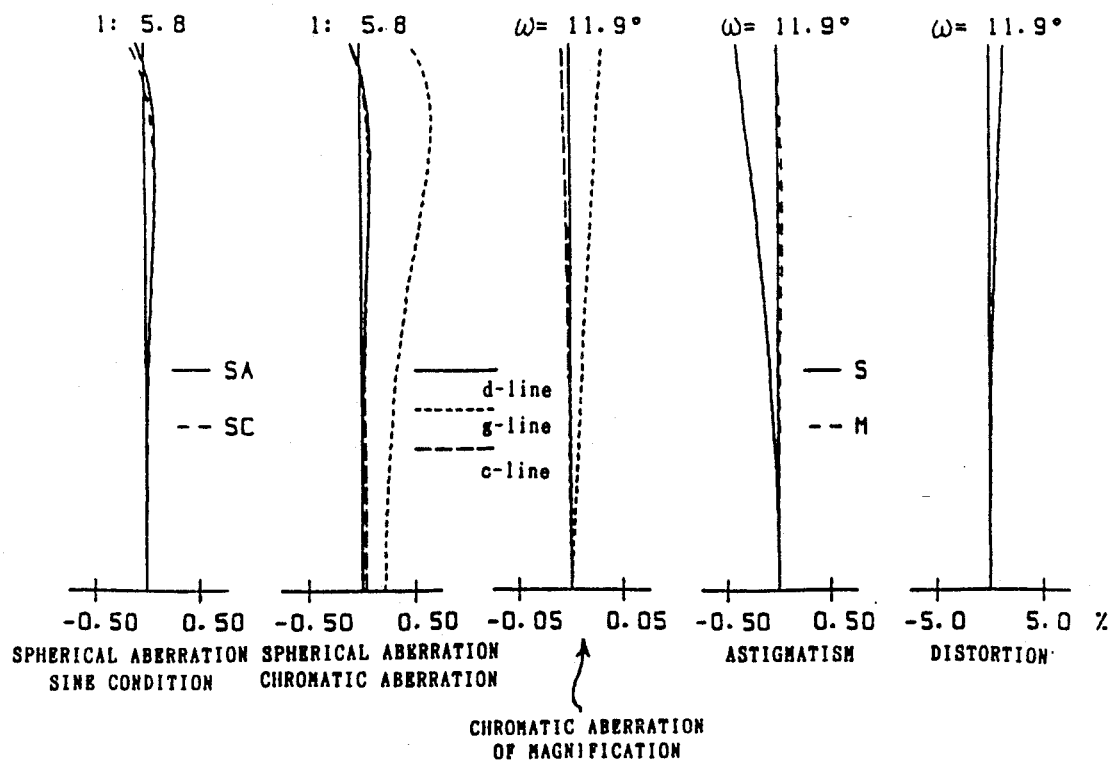
FIG. 17 is a diagram of aberrations in the telescopic end of Embodiment 4.

FIGS. 15, 16 and 17 show the aberrations produced by this arrangement in the wide angle end, intermediate position and telescopic end respectively.

In Embodiment 4, the minimum photographic distance is 0.43 m for any focal length, and the amount of displacement of the first lens group, for focusing from infinity to the shortest photographic distance, is approx. 5 mm.

TABLE 7

| Surface Number | r | d | N | υ |
|---|---|---|---|---|
| 1 | 190.00 | 3.35 | 1.69680 | 55.5 |
| 2 | −2060.000 | 0.10 | | |
| 3 | 107.460 | 1.40 | 1.77250 | 49.6 |
| 4 | 25.200 | 8.75 | | |
| 5 | −90.036 | 1.20 | 1.77250 | 49.6 |
| 6 | 44.700 | 0.10 | | |
| 7 | 39.010 | 4.85 | 1.84666 | 23.8 |
| 8 | 646.382 | variable | | |
| 9 | 55.762 | 4.30 | 1.61800 | 63.4 |
| 10 | −55.762 | 0.10 | | |
| 11 | 31.342 | 6.30 | 1.71300 | 53.8 |
| 12 | −31.342 | 1.10 | 1.80518 | 25.4 |
| 13 | 85.680 | variable | | |
| 14 | −520.000 | 3.90 | 1.80518 | 25.4 |
| 15 | −14.900 | 1.10 | 1.83400 | 37.2 |
| 16 | 58.750 | 1.00 | | |
| 17 | −120.00 | 1.10 | 1.83481 | 42.7 |
| 18 | 83.914 | variable | | |
| 19 | 110.000 | 6.73 | 1.48749 | 70.2 |
| 20 | −24.582 | 0.10 | | |
| 21 | 60.350 | 5.30 | 1.48749 | 70.2 |
| 22 | −53.304 | 2.23 | | |
| 23 | −26.250 | 1.20 | 1.80400 | 46.6 |
| 24 | −94.754 | | | |

TABLE 8

| f | 29.02 | 57.00 | 101.60 |
|---|---|---|---|
| $d_8$ | 42.90 | 14.11 | 2.90 |
| $d_{13}$ | 2.42 | 9.18 | 15.11 |
| $d_{18}$ | 15.09 | 8.33 | 2.40 |
| FNo. | 1:4.1 | 1:4.9 | 1:5.8 |
| ω | 38.0° | 20.7° | 11.9° |
| fb | 40.22 | 53.04 | 76.73 |

The following, Table 9, shows the relation between the embodiments and the aforesaid conditional equations (1) and (2).

TABLE 9

| | $f_1$ | $f_1^2/(f_w \cdot f_t)$ | $f_5$ |
|---|---|---|---|
| Embodiment 1 | −46.509 | 0.596 | −576.58 |
| Embodiment 2 | −38.337 | 0.603 | −207.31 |
| Embodiment 3 | −38.697 | 0.508 | −250.61 |
| Embodiment 4 | −39.648 | 0.533 | |

According to this invention, therefore, the provision of an aperture near the second lens group, which moves together with the second lens group, makes it possible to provide a zoom lens wherein the displacement of the first lens group, required for focusing, is reduced. The diameter of the first lens group is also reduced, and the minimum photographic distance is short.

What is claimed is:

1. A zoom lens having at least four lens groups comprising a negative first lens group, positive second lens group, negative third lens group and positive fourth lens group arranged in order from an object side, wherein distances between said first and second lens groups and between said third and fourth lens groups are reduced, and wherein distance between said second and third lens groups is increased when a power is varied from wide angle to telescopic, and wherein an aperture is provided near said second lens group which moves together when the power is varied, said aperture being positioned on said object side of said second lens group.

2. A zoom lens as defined in claim 1 wherein the following condition is satisfied:

$$0.4 < f_1^2/(fw \cdot ft) < 0.7, \ f_1 < 0$$

wherein:
$f_1$ is a focal length of said first lens group,
fw is a focal length of a whole system in a wide angle end,
ft is the focal length of the whole system in a telescopic end.

3. A zoom lens having five lens groups comprising a negative first lens group, positive second lens group, negative third lens group, positive fourth lens group and negative fifth lens group arranged in order from an object side, wherein distances between said first and second lens groups and between said third and fourth lens groups are reduced, and distances between said second and third lens groups and between said fourth and the fifth lens groups are increased, when power is varied from wide angle to telescopic, and wherein the following conditions are satisfied:

$$0.4 < f_{12}/(fw \cdot ft) < 0.7, \ f_1 < 0$$

$$-0.5 < ft/f_5 < 0.0$$

wherein:
$f_1$ is a focal length of said first lens group,
$f_5$ is a focal length of said fifth lens group,
$f_w$ is a focal length of a whole system is a wide angle end.

$f_t$ is the focal length of the whole system in a telescopic end.

4. A zoom lens as defined in claim 3 wherein said second and fourth lens groups move together when the power is varied.

5. A zoom lens as defined in claim 3 wherein said fifth lens group is fixed with respect to an image plane.

6. A zoom lens having at least four lens groups comprising a negative first lens group, positive second lens group, negative third lens group and positive fourth lens group arranged in order from an object side, wherein distances between said first and second lens groups and between said third and fourth lens groups are reduced, and wherein distance between said second and third lens groups is increased when a power is varied from wide angle to telescopic, and wherein an aperture is provided near said second lens group which moves together when the power is varied, wherein the following condition is satisfied:

$$0.4 < f_1^2/(fw \cdot ft) < 0.7, \ f_1 < 0$$

wherein:
$f_1$ is a focal length of said first lens group,
fw is a focal length of a whole system in a wide angle end,
ft is the focal length of the whole system in a telescopic end.

* * * * *

UNITED STATES PATENT AND TRADEMARK OFFICE
CERTIFICATE OF CORRECTION

PATENT NO. : 5,264,965
DATED : November 23, 1993
INVENTOR(S) : Jun HIRAKAWA

It is certified that error appears in the above-indentified patent and that said Letters Patent is hereby corrected as shown below:

```
    At column 7, line 1 (claim 2, line 3) change "fw.ft" to
---fw·ft---.
    At column 7, line 21 (claim 3, line 13) change "fw.ft" to
---fw·ft---.
    At column 7, line 28 (claim 3, line 20) change "is" to
---in---.
    At column 7, line 29 (claim 3, line 21) change "." to ---,---.
    At column 8, line 21 (claim 6, line 14) change "fw.ft" to
---fw·ft---.
```

Signed and Sealed this

Twelfth Day of September, 1995

Attest:

BRUCE LEHMAN

*Attesting Officer*         *Commissioner of Patents and Trademarks*